US008126507B2

(12) United States Patent
Cofta

(10) Patent No.: US 8,126,507 B2
(45) Date of Patent: Feb. 28, 2012

(54) COMMUNICATIONS DEVICE MONITORING

(75) Inventor: Piotr L Cofta, Ipswich (GB)

(73) Assignee: British Telecommunications public limited company, London (GB)

( * ) Notice: Subject to any disclaimer, the term of this patent is extended or adjusted under 35 U.S.C. 154(b) by 828 days.

(21) Appl. No.: 12/293,896

(22) PCT Filed: Mar. 12, 2007

(86) PCT No.: PCT/GB2007/000859
§ 371 (c)(1),
(2), (4) Date: Sep. 22, 2008

(87) PCT Pub. No.: WO2007/107701
PCT Pub. Date: Sep. 27, 2007

(65) Prior Publication Data
US 2009/0131109 A1 May 21, 2009

(30) Foreign Application Priority Data
Mar. 22, 2006 (EP) ..................................... 06251528

(51) Int. Cl.
*H04M 1/00* (2006.01)
*H04B 1/38* (2006.01)
(52) U.S. Cl. ..... 455/558; 455/410; 455/411; 455/414.1; 455/418
(58) Field of Classification Search .................. 455/558, 455/410, 411, 414.1, 418, 419, 424, 428, 455/67.11
See application file for complete search history.

(56) References Cited

U.S. PATENT DOCUMENTS

| 6,978,157 | B1 * | 12/2005 | Amiens .................. 455/558 |
| 7,996,041 | B2 * | 8/2011 | Cheng .................. 455/558 |
| 2005/0050437 | A1 * | 3/2005 | Giraud et al. ............ 715/500 |
| 2005/0059352 | A1 | 3/2005 | McLean |
| 2007/0226390 | A1 | 9/2007 | Erny et al. |

FOREIGN PATENT DOCUMENTS

| FR | 2 864 276 | 6/2005 |
| WO | 98/10611 | 3/1998 |
| WO | 02/17048 | 2/2002 |
| WO | 2004/063970 | 7/2004 |

OTHER PUBLICATIONS

International Search Report for PCT/GB2007/000859, mailed Oct. 11, 2007.
Philippsa, J. et al., "Model-Based Test Case Generation for Smart Cards", Electronic Notes in Theoretical Computer Science, vol. 80, pp. 170-184, (Aug. 2003).

* cited by examiner

Primary Examiner — Tuan Pham
(74) Attorney, Agent, or Firm — Nixon & Vanderhye P.C.

(57) ABSTRACT

A method, and devices, for a first communications device (10) e.g. a Subscriber Identity Module (SIM) to monitor a second communications device, e.g. a mobile telephone (1). The method comprises: the SIM (10) sending a program (16) stored at the SIM (10) to the mobile telephone (1); the mobile telephone (1) running the program (16) to provide one or more outcomes; the mobile telephone (1) sending the one or more outcomes to the SIM (10); the SIM (10) comparing the one or more outcomes to one or more correct outcomes (18) stored at the SIM (10); and the SIM (10) evaluating the result of the comparison according to one or more policies (20) stored at the SIM (10).

19 Claims, 3 Drawing Sheets

COMMUNICATIONS DEVICE MONITORING

This application is the U.S. national phase of International Application No. PCT/GB2007/000859, filed 12 Mar. 2007, which designated the U.S. and claims priority to filed Europe Application No. 06251528.3 filed 22 Mar. 2006, the entire contents of each of which are hereby incorporated by reference.

The present invention relates to monitoring a communications device to verify, determine or otherwise assess the behaviour, condition or integrity of the communications device. The present invention relates in particular, but not exclusively, to monitoring a mobile communications device having a Subscriber Identity Module (SIM) located in the mobile communications device.

In the field of communications devices conventional approaches are provided for a first communications device to monitor a second communications device, in particular so that the first communications device can verify, determine or otherwise assess the behaviour, condition or integrity of the second communications device.

In some conventional approaches, the first communications device observes external signs of activity of the second communications device. In other conventional approaches, the first communications device engages in a pre-defined communications interaction with the second communications device to verify whether the second communications device performs correctly with respect to the interaction. For example, the first communications device may open an Internet connection at set time intervals to determine whether the second communications device is able to accept the Internet connection.

A common type of communication device, the mobile telephone, is becoming increasingly susceptible to outside influences on its integrity, due to increasing use of mobile telephones for data and software download, Internet connection, and so on. For example, mobile telephones are increasingly likely to be subject to malicious influences such as viruses and worms.

US20050033987 describes a mobile terminal that can carry out an integrity check on itself based on a trusted platform concept, for example the Trusted Computing Platform (TCP), using integrity metrics. Data Is stored, for example on a SIM in the mobile terminal.

US20040243801 describes a system in which a mobile telephone can perform a self-check, using integrity metrics, in response to a request for verification.

In a first aspect, the present invention provides a method for a first communications device to monitor a second communications device, the method comprising: the first communications device sending a program stored at the first communications device to the second communications device; the second communications device running the program to provide one or more outcomes; the second communications device sending the one or more outcomes to the first communications device; the first communications device comparing the one or more outcomes to one or more correct outcomes stored at the first communications device; and the first communications device evaluating the result of the comparison according to one or more policies stored at the first communications device.

The first communications device may be located in the second communications device.

The first communications device may be a smart card and the second communications device may comprise means for coupling with the smart card.

The first communications device comprises cellular communications system Subscriber Identity Module, SIM, functionality and the second communications device is a mobile communications device that uses the SIM functionality of the first communications device.

The first communications device may not have a capability to run the program.

The first communications device may select the program to send to the second communications device from among a plurality of programs stored at the first communications device.

The first communications device may select randomly or pseudo-randomly the program to send to the second communications device from among a plurality of programs stored at the first communications device.

The method may be such that as a result of the evaluating step, when one or more received outcomes is not the same as the correct outcomes, the first communications device ceases co-operating with the second communications device. Ceasing co-operating may comprise declining to provide cellular communications system authorisation.

The method may be such that as a result of the evaluating step, when one or more received outcomes is not the same as the correct outcomes, the first communications device contacts a network operator of the cellular communications system through the second communications device.

In a further aspect, the present invention provides a first communications device adapted to monitor a second communications device, the first communications device comprising: storage means, the storage means storing a program, correct outcomes of the program, and policies; means adapted to send the program to a second communications device; means adapted to receive one or more outcomes of running the program from the second communications device; means adapted to compare the received one or more outcomes to corresponding correct outcomes of the stored correct outcomes; and means adapted to evaluate the result of the comparison according to one or more of the stored policies.

The first communications device may be adapted to be located in the second communications device.

The first communications device may be a smart card.

The first communications device may comprises cellular communications system Subscriber Identity Module, SIM, functionality.

The first communications device may not have a capability to run the program.

The program may be one of a plurality of programs stored by the storage means; and the first communications device may further comprise means adapted to select the program from among the plurality of programs. The means adapted to select the program from among the plurality of programs may be adapted to perform the selection randomly or pseudo-randomly.

The first communications device may further comprise means for, as a result of the evaluating step, when one or more received outcomes is not the same as the correct outcomes, ceasing co-operating with the second communications device. Ceasing co-operating may comprise declining to provide cellular communications system authorisation.

The first communications device may further comprise means for, as a result of the evaluating step, when one or more received outcomes is not the same as the correct outcomes, contacting a network operator of the cellular communications system through the second communications device.

In a further aspect, the present invention provides a second communications device adapted to be monitored by a first communications device, the second communications device comprising: means adapted to receive a program from a first communications device; means adapted to run the program to provide one or more outcomes; and means adapted to send the one or more outcomes to the first communications device.

The second communications device may further comprise means for locating the first communications device in the second communications device.

The first communications device is a smart card.

The second communications device may be a mobile communications device adapted to use cellular communications system Subscriber Identity Module, SIM, functionality of the first communications device.

In further aspects, the present invention provides a storage medium storing processor-implementable instructions for controlling one or more processors to carry out the method or implement the devices of any of the above aspects.

Thus the present invention provides an active monitoring process in which integrity metrics are not required to be measured.

In certain aspects, the present invention provides an active monitoring process for a mobile device, for example a mobile telephone, by using a SIM, or a card or other module comprising SIM functionality, located in the mobile device, as the monitoring device in the active monitoring process. This advantageously makes use of the SIM's typically greater resistance to outside influences compared to that of the mobile device.

Embodiments of the invention will now be described, by way of example only, with reference to the accompanying drawings, in which.

Figure 1:
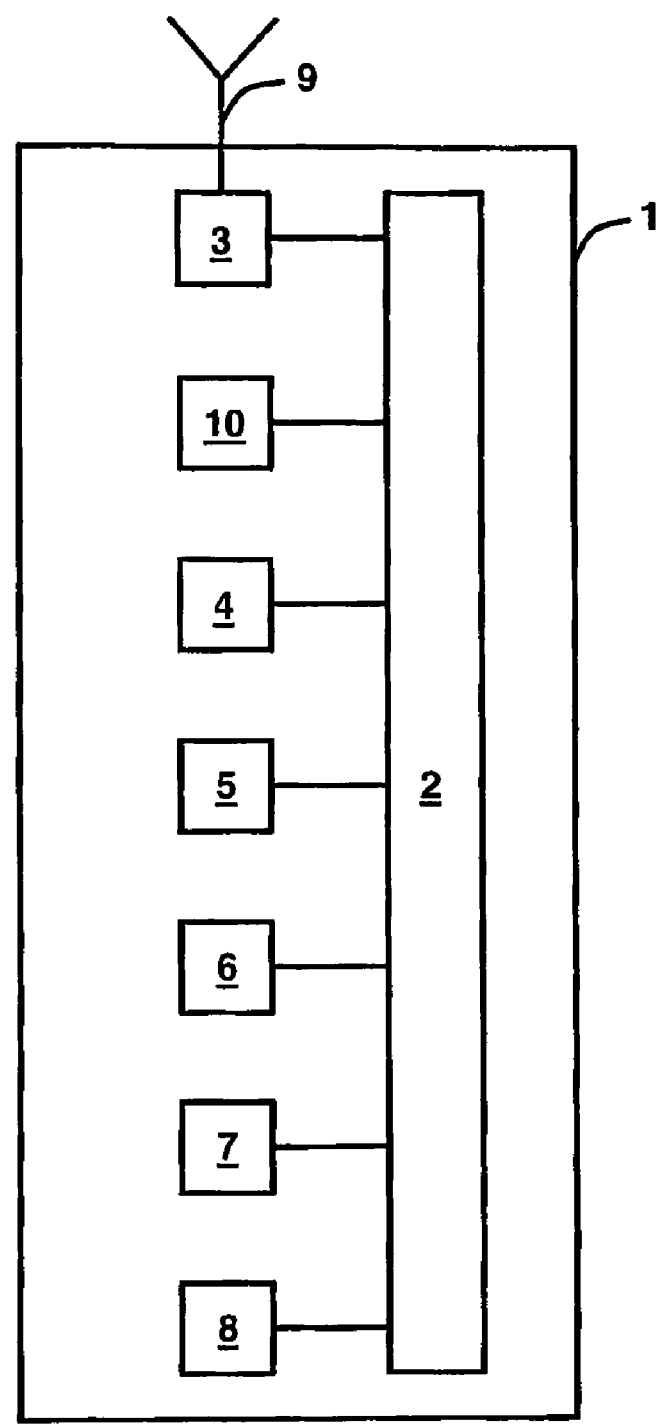
FIG. 1 is a block diagram showing certain functional modules of a mobile device in which a first embodiment of the present invention is implemented.

FIG. 1 is a block diagram showing certain functional modules of a mobile device 1 in which a first embodiment of the present invention is implemented. In this embodiment the mobile device 1 is a mobile telephone 1. The mobile telephone 1 comprises a processor 2, hereinafter referred to as the telephone processor 2, and the following modules, each of which are coupled to the processor 2: a radio input/output module 3, a storage medium 4, a user interface 5, a display 6, a loudspeaker 7 and a microphone 8. The storage medium 4 of the mobile telephone 1 is hereinafter referred to as the telephone storage medium 4. The radio input/output module 3 is further coupled to an antenna 9.

A SIM 10 is shown located in the mobile telephone 1. The SIM 10 is coupled to the telephone processor 2 of the mobile telephone 1. When located in the mobile telephone 1, the SIM 10 is often considered as, or described as, being part of the mobile telephone 1. However, the present embodiment is most readily described by considering the SIM 10 as a separate communications device to the mobile telephone 1. In the present embodiment, the mobile telephone 1 and the SIM 10 operate according to the UMTS specification (Universal Mobile Telecommunication System), as specified in ETSI (European Telecommunications Standards Institute) specifications TS102.221, TS131.101, TS131.102 and other related specifications, except where described otherwise below.

In operation, the mobile telephone 1, under control of the telephone processor 2, and where appropriate using instructions and/or data stored in the telephone storage medium 4, carries out conventional mobile telephone operation according to the UMTS specification, as described in the following overview. Wireless signals are sent to, and received from, base stations of a cellular communications system using the antenna 8, with modulation and demodulation being performed by the radio input/output module 3. The user interface 5, comprising a keyboard and other touch devices enables a user to input instructions and data. The display 6 displays information, such as telephone numbers, network details, images and so on to the user. The loudspeaker 7 and the microphone 8 enable the user to respectively input and hear audio information, e.g. speech during a telephone call. The SIM 10 provides data and cellular communications network connectivity functionality to the mobile telephone 1. This allows the mobile telephone 1 to send and receive short message service (SMS) messages including multi-media messages, partake in telephone calls, access the Internet, download data and software, and so on.

It will be appreciated that the mobile telephone 1 comprises many other conventional components and functions in addition to the functional modules described above. It will also be appreciated that the functional modules described above may exhibit many other conventional functions and details. However, further explanation of any of these additional conventional components, functions and details is not necessary for understanding the present invention, and moreover they are readily implemented by the skilled person.

Figure 2:
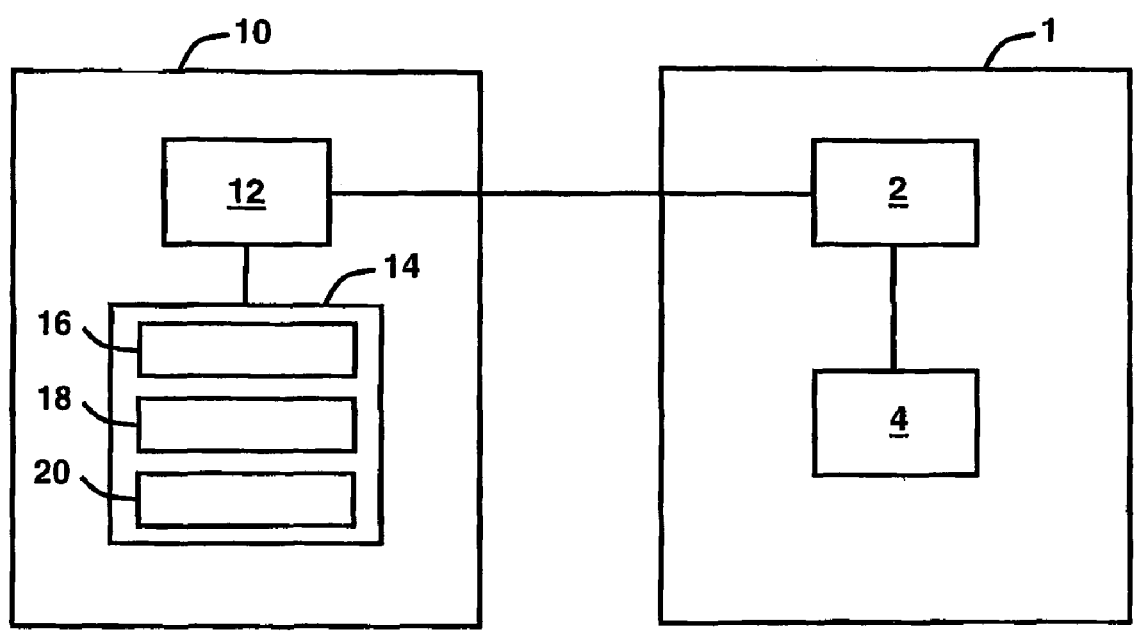
FIG. 2 is a block diagram showing certain functional modules of the mobile device of FIG. 1 and certain functional modules of SIM located in the mobile device.

FIG. 2 is a block diagram showing certain of the above described functional modules of the mobile telephone 1 and certain functional modules of the SIM 10. In particular, FIG. 2 shows the telephone processor 2 and the telephone storage medium 4 of the mobile telephone 1. As shown in FIG. 2, the SIM 10 comprises a processor 12, hereinafter referred to as the SIM processor 12. The SIM processor 12 is coupled to the telephone processor 2. The SIM 12 further comprises a storage medium 14, hereinafter referred to as the SIM storage medium 14. The SIM storage medium 14 is coupled to the SIM processor 12. Operation of the SIM 10 is controlled by the SIM processor 12 in conventional fashion, where appropriate using conventional algorithms, instructions and data (not shown in FIG. 2) stored in the SIM storage medium 14.

In this embodiment the SIM storage medium 14 comprises, in addition to the above mentioned conventional algorithms, instructions and data, further algorithms, instructions and data for use in a process of monitoring the mobile telephone 2, which process will be described in more detail below with reference to FIG. 3. As shown in FIG. 2, the further algorithms, instructions and data for use in the monitoring process comprise test programs 16, correct outcomes 18, and policies 20. In this embodiment the test programs 16 are provided using the SIM Application Toolkit. In particular, proactive commands in the SIM Application Toolkit are used to make the communication between the SIM and the mobile telephone two-way by virtue of the mobile telephone polling the SIM. Further details of the test programs 16, correct outcomes 18, and policies 20 will be described in more detail below.

Figure 3:
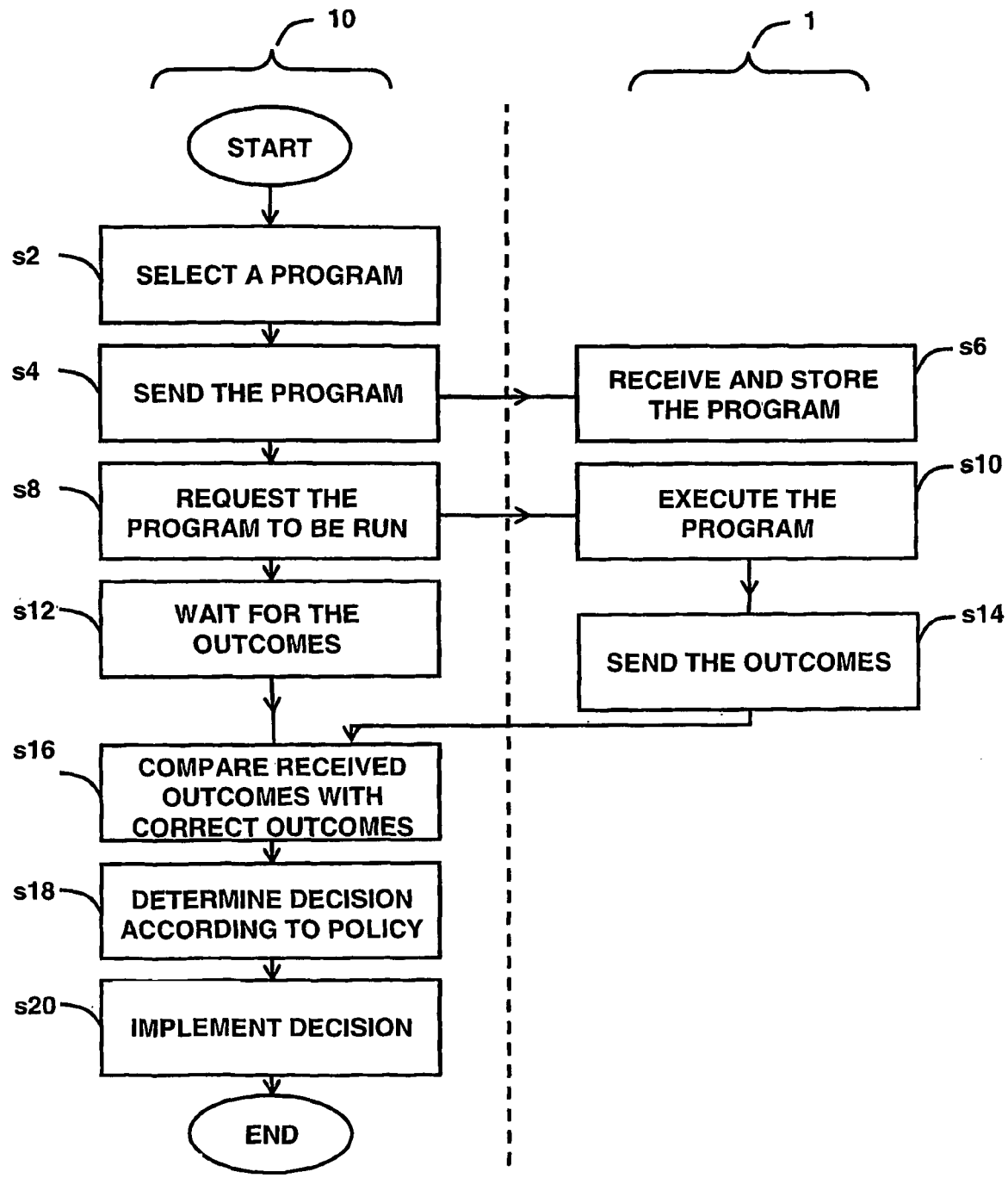
FIG. 3 is a process flowchart showing certain steps carried out by the SIM and the mobile device in an embodiment of a monitoring process.

FIG. 3 is a process flowchart showing certain steps carried out by the SIM 10 and the mobile telephone 1 in this embodiment of a monitoring process. At the top of the flowchart, the reference numeral 10 indicates those steps carried out by the SIM 10, and the reference numeral 1 indicates those steps carried out by the mobile telephone 1.

At step s2, the SIM 10, more particularly the SIM processor 12, selects one of the test programs 16.

At step s4, the SIM 10 sends the selected test program 16 to the mobile telephone 1.

At step s6, the mobile telephone 1 receives the test program, and under control of the telephone processor 2 stores the test program 16 in the telephone storage medium 4.

At step s8, the SIM 10, more particularly the SIM processor 12, requests the program 16 to be run, by sending a request message to the mobile telephone 1.

A step s10, the mobile telephone 1, more particularly the telephone processor 2, executes the program stored in the telephone storage medium 4.

Meanwhile, at step s12, the SIM 10 awaits the outcomes of the test program 16 being run by the mobile telephone 1.

At step s14, the outcomes of the test program are sent by the mobile telephone 1 to the SIM 10. In this embodiment the outcomes are sent according to instructions contained in the test program 16 itself. This has an advantage that any corrupted program in the mobile telephone need not be involved in the process. Nevertheless, this is not essential, and in other embodiments, the mobile telephone 2 can be pre-programmed with instructions to send any outcomes from test programs to the source of the testing program, i.e. in this case the SIM 10.

At step s16, the SIM 10, more particularly the SIM processor 12, compares the received outcomes with the correct outcomes 18 stored in the SIM storage medium 14.

At step s18, the SIM 10, more particularly the SIM processor 12, determines a decision for the received outcomes, when compared with the correct outcomes 18, according to the policies 20 stored in the SIM storage medium 14. In this embodiment, the policies 20 simply specify that if the comparison step s16 indicates that the received outcomes are the same as the correct outcomes 18 then the SIM 10 continues to cooperate with the mobile telephone 1, whereas if the comparison step s16 indicates that any of the receive outcomes are different to the correct outcomes 18 then the SIM 10 stops co-operating with the mobile telephone 1. Many other policies 20 may be implemented, and other such possibilities will be discussed later below.

At step s20, the SIM 10 implements the decision determined at step s18. Hence, in this embodiment, at step s20, SIM 10 continues to co-operate with the mobile telephone 1 if the received outcomes were the same as the stored correct outcomes 18, whereas SIM 10 stops co-operating with the mobile telephone 1 if the received outcomes were different to the stored correct outcomes 18.

A time out option may be provided such that if the mobile telephone 1 does not return any outcomes within a given time from being instructed to run the test program, then this is in itself considered as a received outcome by the SIM 10, and this outcome is accorded a policy.

It should be noted that certain of the process steps depicted in the flowchart of FIG. 3 and described above may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally. For example, steps s4 and s8 may be performed as one step, i.e. the SIM 10 may send the program to the device and the request to run the program at the same time. Another possibility is omission of the step of the SIM 10 requesting the program to be run, and instead the mobile telephone automatically executing any such received test program.

Thus a process is provided in which a program stored at the SIM 10 is executed by the mobile telephone 1, and the outcome of the program is returned to the SIM to evaluate. Thus a process is provided in which the relatively more secure SIM can effectively probe the status of the relatively less secure mobile telephone. Furthermore, because the test programs are stored at the SIM and not at the mobile telephone (except when due to be executed), any attacker of the mobile telephone cannot ascertain what programs any tampered version of the mobile telephone will need to be able to carry out to mask any changes made to the mobile telephone.

In the above embodiments, the SIM 10 and mobile telephone 1 operate according to the UMTS specification. In other embodiments, the SIM 10 and mobile telephone may instead, or in addition, operate according to other cellular communications specifications, for example Global System for Mobile Communications (GSM).

In the above embodiment the mobile communications device is a mobile telephone. In other embodiments other types of mobile device may be employed, for example a personal digital assistant or other device linked to a mobile radio receiver or module.

Indeed, in other embodiments, the communications device being monitored need not be a mobile device. For example, communications devices which although not portable nevertheless employ a SIM or other smart card, of the type described in the following paragraphs may be the device being monitored.

In the above embodiments, the element performing the monitoring of the mobile telephone is a conventional UMTS SIM adapted by programming using the SIM application toolkit. Also, dual SIM with more than one authentication means can be used. For example, dual SIM with more than one authentication means (for example with two SIM functionalities embedded on the same physical card) can be used. In other embodiments, the SIM functionality used in the above embodiments may be housed and delivered in physical forms other than a conventional SIM card. For example, the functionality may be provided on a Secure Digital (SD) card or a Multi Media Card (MMC). More generally, the device performing the monitoring may be any type of smart card, i.e. a module comprising processing as well as memory, with the device being monitored being any communications device with means for coupling with the smart card. In each such embodiment, due to the physical location of the SIM or e.g. other smart card in the device being monitored, it can be typically assumed that a required level of trust between the monitoring device and the device being monitored is present. Nevertheless, as a further generalisation, in other embodiments coupling between the SIM or e.g. other smart card with the device being monitored may instead be provided remotely, for example over a Bluetooth wireless link or other local wireless link.

The test programs may be written in any suitable programming language, with the device being monitored being provided with processing means for executing programs in the chosen language. However, preferably the test programs are in a conveniently portable language such as Java. Mobile telephones meeting the UMTS specification typically comprise a Java capability therein. Therefore, such conventional mobile telephones may be simply adapted for use in the above embodiments by providing them with a Java-SIM connection. This may be provided consistent with the JCP (Java Community Process) specification of JSR177 (SATSA): Security and Trust which enables integration of these, and by incorporating a CLDC (Connected Limited Device Configuration) platform. The use of Java is beneficial as it guarantees high portability of the test program between different mobile telephones so that SIM does not have to keep different variants of the same test program for different telephones. Further, the use of SATSA enables the creation of complex test cases while the ability to sign the latest program provides additional security for the mobile device.

It will be appreciated that the test programs may be ones that can be stored in the SIM but are too complex to be have been executed in the SIM. For example, the SIM may have insufficient processing power, whereas the mobile communications device has more processing power and is able to execute the program. This advantageously allows a synergy to be achieved between the security of the SIM and the processing power of the device being monitored, i.e. the relative complexity of the test programs that may be employed.

The test programs may be of any desired complexity. Typically, for higher complexity programs there will be a greater chance of finding problems, whereas for lower complexity programs there will typically be a lower processing and storage burden. One example is, say, to instruct the device being monitored to add three specified memory values and send the sum as an outcome. Another example, say, is to instruct the device being monitored to measure a current and send the measured current value as the outcome, where the current value is one that indicates that the display, e.g. display 6 in above described mobile telephone 1, is correctly functioning. Another example is the test program can require the device being monitored, e.g. a mobile telephone, to communicate in a specific way with the cellular communications network operator.

The choice of which stored test program to send to the device being monitored can be determined according to any desired criterion according to the requirements of the arrangement under consideration. For example, the test program may be chosen randomly or pseudo-randomly (this option in particular enforces the earlier described advantage of the test programs being stored at the SIM and not at the mobile telephone in relation to any attacker of the mobile telephone therefore not being able to ascertain what programs any tampered version of the mobile telephone will need to be able to carry out to mask any changes made to the mobile telephone). Another possibility is the test program may be selected by sequentially from a sequentially ordered list. For example, yet another possibility is the program may be selected from the stored programs according to some algorithm that takes account of previous outcomes.

In any of the above embodiments, the test programs sent from the SIM or corresponding card or device to the device being monitored may be digitally signed programs, and the device being monitored correspondingly programmed or otherwise set up to grant the necessary rights to the digitally signed programs.

In the above described embodiments, a plurality of test programs are stored at the SIM or corresponding device. However, in other simpler embodiments, only one test program is stored at the SIM and used in the monitoring process.

For the avoidance of doubt, it is noted that the term "program" as used in the above description encompasses similar terms used in the art, such as "application".

The policies described above may be of many different forms. A simple policy is, as described above, for the SIM or corresponding device to cease co-operating with the device being monitored if the outcomes received are not the same as the expected, i.e. correct outcomes. This may include refusing to carry out network authentication, e.g. UMTS or GSM authentication with the network operator. Other policies may be based on more complicated algorithms, for example a weighting or similar operation carried out to determine a significance of one or more differences between received outcomes and correct outcomes. The policies may be such that resulting actions may further include contacting the network operator to report a discrepancy. This may be over a secure communication link provided via the device being monitored, for example when the device being monitored is a mobile telephone, the secure communication link may comprise sending an SMS message or call to the network operator. The policies may be hard-coded, or may updatable in some manner. For example, they may be altered by user input. Another possibility is that the network operator may use a secure communication through the device being monitored to communicate with the SIM. For example, the network operator may change settings in the SIM memory, thereby changing the selection of test programs, policies, correct outcomes and so on.

In the above embodiments, a plurality of policies are stored at the SIM. However, in simpler embodiments, only one policy is stored and used, e.g. a policy of ceasing co-operation with the device being monitored in the event of any received outcome not matching the corresponding stored correct outcome.

In the above embodiments, there a plurality of outcomes are provided when the test program is run. However, in simpler embodiments, there may be just one outcome when the test program is run.

In the above embodiments, the test programs are provided using the SIM Application Toolkit. In particular, proactive commands in the SIM Application Toolkit are used to make the communication between the SIM and the mobile telephone two-way by virtue of the mobile telephone polling the SIM. In other embodiments, other functionality may be added to a conventional SIM (or corresponding device or card) and/or the mobile telephone or other device being monitored such as to provide that the SIM may push the test programs to the mobile telephone and/or the mobile telephone may pull the test programs from the SIM. One such possibility is that a conventional smartphone (e.g. in a form of PDA or a handheld device) equipped with an open operating system such as Symbian or Windows Mobile as typically used in mobile telephones under UMTS or GSM, may be adapted as required.

More generally, the above embodiments may be implemented by providing new designs of communications device, e.g. mobile telephone and/or SIM card, or by configuring or adapting previous designs of device. The described functionality may be provided by hardware, firmware, software, or any combination of these For example existing processors/ storage medium may be programmed (for example with data stored at the described storage medium) to provide the above described processes. As such the described processes may be implemented by a processor implementing processor-implementable instructions stored at the storage medium. The storage medium may be any suitable storage medium, such as computer memory, ROM, PROM etc. Any described processor may comprise plural processors.

The invention claimed is:

1. A method for a first communications device to monitor a second communications device, the method comprising:
the first communications device sending a program stored at the first communications device to the second communications device;
the second communications device running the program to provide one or more outcomes;
the second communications device sending the one or more outcomes to the first communications device;
the first communications device comparing the one or more outcomes to one or more correct outcomes stored at the first communications device; and the first communications device evaluating the result of the comparison according to one or more policies stored at the first communications device, wherein the first communications device is a smart card and the second communications device includes means for coupling with the smart card.

2. A method according to claim 1 wherein the first communications device is located in the second communications device.

3. A method according to claim 1, wherein the first communications device comprises cellular communications system Subscriber Identity Module, SIM, functionality and the second communications device is a mobile communications device that uses the SIM functionality of the first communications device.

4. A method according to claim 1, wherein the first communications device does not have a capability to run the program.

5. A method according to claim 1, wherein the first communications device selects the program to send to the second communications device from among a plurality of programs stored at the first communications device.

6. A method according to claim 5, wherein the first communications device selects randomly or pseudo-randomly the program to send to the second communications device from among the plurality of programs stored at the first communications device.

7. A method according to claim 1, wherein as a result of the evaluating step, when one or more received outcomes is not the same as the correct outcomes, the first communications device ceases co-operating with the second communications device.

8. A method according to claim 7, wherein ceasing co-operating comprises declining to provide cellular communications system authorisation.

9. A method according to claim 3, wherein as a result of the evaluating step, when one or more received outcomes is not the same as the correct outcomes, the first communications device contacts a network operator of the cellular communications system through the second communications device.

10. A first communications device adapted to monitor a second communications device, the first communications device comprising:
    storage means, the storage means storing a program, correct outcomes of the program, and policies;
    means adapted to send the program to a second communications device;
    means adapted to receive one or more outcomes of running the program from the second communications device;
    means adapted to compare the received one or more outcomes to corresponding correct outcomes of the stored correct outcomes; and
    means adapted to evaluate the result of the comparison according to one or more of the stored policies, wherein the first communications device is a smart card.

11. A first communications device according to claim 10, wherein the first communications device is adapted to be located in the second communications device.

12. A first communications device according to claim 10, wherein the first communications device further comprises cellular communications system Subscriber Identity Module, SIM, functionality.

13. A first communications device according to claim 10, wherein the first communications device does not have a capability to run the program.

14. A first communications device according to claim 10, wherein the program is one of a plurality of programs stored by the storage means; and the first communications device further comprises means adapted to select the program from among the plurality of programs.

15. A first communications device according to claim 14, wherein the means adapted to select the program from among the plurality of programs are adapted to perform the selection randomly or pseudo-randomly.

16. A first communications device according to 11, further comprising means for, as a result of the evaluating step, when one or more received outcomes is not the same as the correct outcomes, ceasing co-operating with the second communications device.

17. A first communications device according to claim 16, wherein ceasing co-operating comprises declining to provide cellular communications system authorisation.

18. A first communications device according to claim 12, further comprising means for, as a result of the evaluating step, when one or more received outcomes is not the same as the correct outcomes, contacting a network operator of the cellular communications system through the second communications device.

19. A non-transitory storage medium storing processor-implementable instructions for controlling one or more processors to carry out the method of claim 1.

* * * * *